Nov. 18, 1947.  C. G. HEBEL  2,430,930
ELECTRO-HYDRAULIC LOCK AND TEMPERATURE
COMPENSATOR FOR LIQUID CONTROL GEARS
Filed April 25, 1945  2 Sheets-Sheet 2
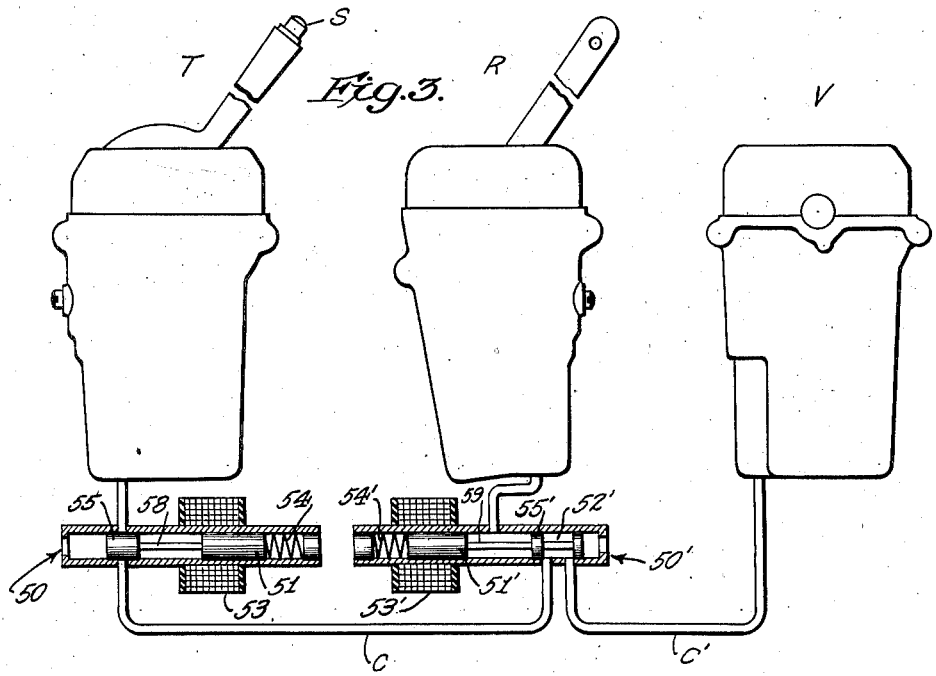
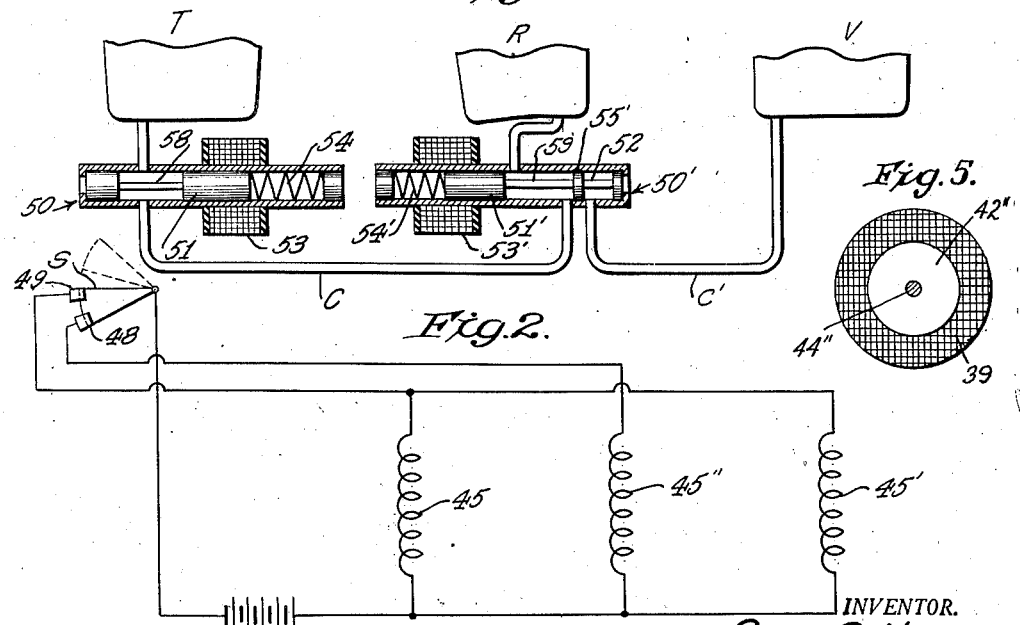
INVENTOR.
CARL G. HEBEL
BY
Joseph H. Lipschutz
ATTORNEY Patented Nov. 18, 1947

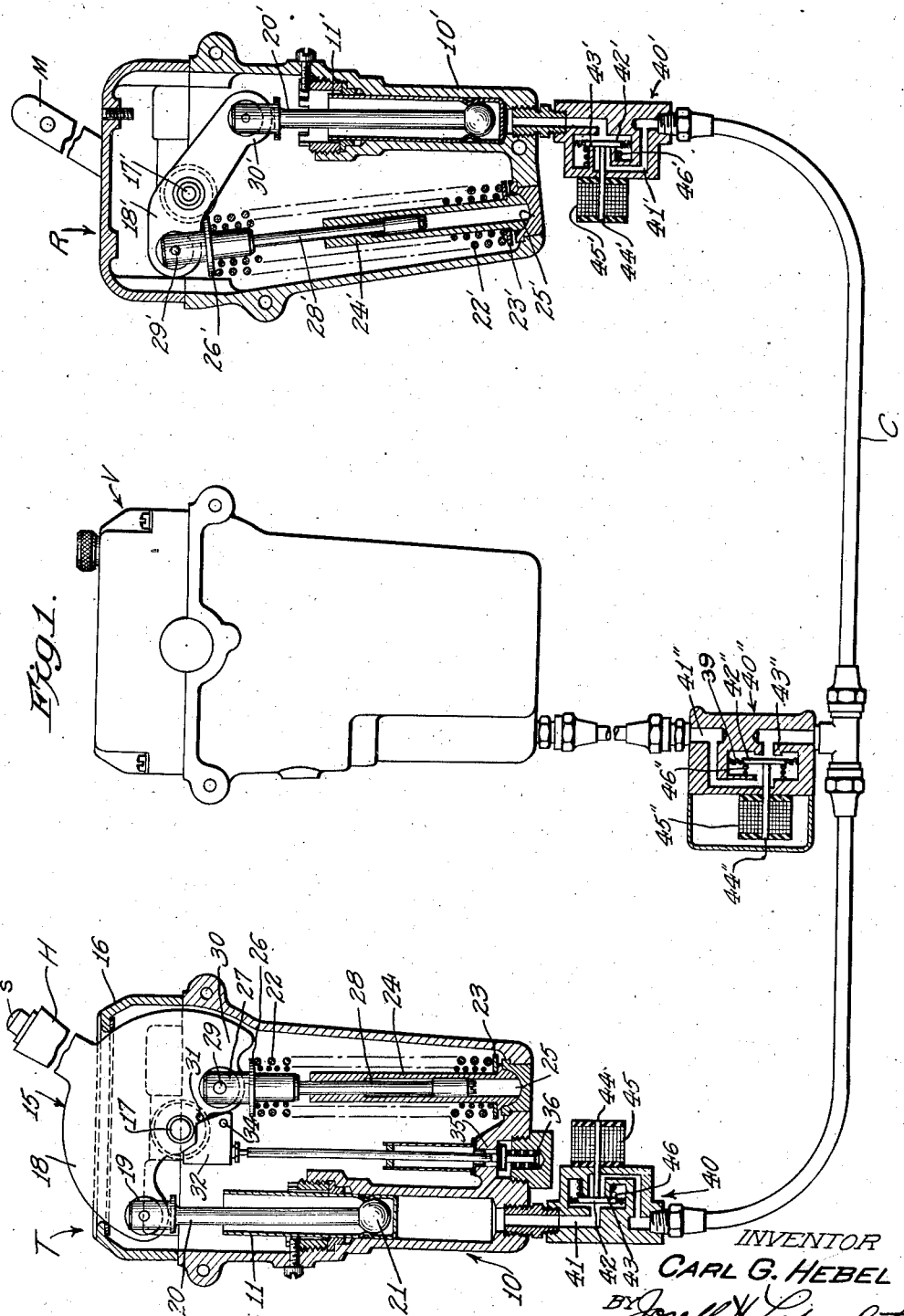

2,430,930

UNITED STATES PATENT OFFICE 2,430,930

ELECTROHYDRAULIC LOCK AND TEMPERATURE COMPENSATOR FOR LIQUID CONTROL GEARS

Carl G. Hebel, Leonia, N. J., assignor to Sperry Products, Inc., Hoboken, N. J., a corporation of New York Application April 25, 1945, Serial No. 590,250

13 Claims. (Cl. 60—54.5)

1

This invention relates to liquid control gear of the type wherein movement of a member at a transmitting station is caused to control movement of a member at a receiving station. More particularly, this invention relates to one-pipe systems wherein the movable members are normally under pressure. Such systems are disclosed, for example, in the patent to H. S. Hele-Shaw and T. E. Beacham No. 1,983,884, granted December 11, 1934, and in the patent to Alfred N. Lawrence No. 2,197,554, granted April 16, 1940. In the first of these patents, a constant force is applied to the liquid in every position of the transmitter handle to balance a constant force at the receiver. In the second patent, a continuously increasing force is applied to the liquid in progressive positions of the transmitter handle to balance a similarly increasing load on the receiver. In either of the aforementioned cases, the operating and operated members are in normally balanced condition and will tend to retain any positions into which they may be moved.

One of the problems created by such systems is the expansion and contraction of the liquid contained between the transmitter and the receiver. Since the bulk of the liquid is contained in the duct which connects the transmitter and the receiver, it has been proposed that in the normal condition of the transmission system when the transmitter handle and the receiver member are not being operated, the duct should be disconnected from the transmitter and receiver and connected to an expansion chamber so that the liquid in the duct is free to expand or contract freely. However, when the transmitter handle is actuated, the duct is automatically disconnected from the expansion chamber and connected to the transmitter and the receiver, so that operation of the transmission system may be effected. To accomplish this result, valves were provided between one end of the duct and the transmitter, between the other end of the duct and the receiver, and between the expansion chamber and the duct. The operator was required to apply all of the additional pressure necessary to effect operation of these valves and such additional pressure was found to be of considerable magnitude, and, therefore, interfered with the free operation of the system as well as necessitating the application of, in some instances, an almost prohibitive force by the operator.

It is one of the principal objects of this invention to provide a system as described above wherein the duct is normally connected to an expansion chamber and disconnected from the transmitter and the receiver but wherein the duct may be readily connected to the transmitter and receiver and disconnected from the expansion chamber without necessitating the application of any additional force to the transmitter handle.

In the systems heretofore proposed, the duct was not connected to the transmitter and receiver and disconnected from the expansion chamber until additional force was applied to the transmitter handle, that is, until the transmitter handle was actually operated. This caused some delay in the transmission of the force since the initial application of the force was not effective to operate the transmitter but rather was employed for the purpose of connecting the duct to the transmitter and receiver and disconnecting it from the expansion chamber. It is a further object of this invention to provide means whereby such connection and disconnection of the duct may be effected without the application of force to the transmitter handle, and, therefore, before the transmitter handle is actuated. Thus, when the transmitter handle is actuated there will be no delay in transmitting the applied force.

In methods heretofore proposed, separate valves were employed not only to connect one end of the duct to the transmitter and the other end of the duct to the receiver, but also for connecting the duct to the expansion chamber.

It is another object of this invention to provide an additional embodiment of my invention wherein the separate valve between the duct and the expansion chamber is eliminated and only valves between the ends of the duct and the transmitter and the receiver are employed.

Another principal object of my invention is to provide means for disconnecting the duct from the expansion chamber before connecting the duct to the transmitter and the receiver, and, further, for disconnecting the duct from the transmitter and the receiver before connecting it to the expansion chamber.

Further objects and advantages of this invention will become apparent in the following detailed description thereof.

In the accompanying drawings,

Fig. 1 is an assembly view partly sectioned vertically, illustrating one embodiment of my invention in a single-pipe liquid control gear.

Fig. 2 is a wiring diagram of the electric circuit employed in Fig. 1.

Fig. 3 is a view similar to Fig. 1 showing a modified form of this invention.

Fig. 4 is a view of a portion of Fig. 3 showing another position of the valves.

Fig. 5 is an elevation of a detail showing in enlarged form a valve and its associated centralizing means.

Referring to the drawings, there is shown a liquid control gear system comprising a transmitter T connected to a receiver R through a duct C which connects the transmitter to the receiver. Force is adapted to be applied at the transmitter by actuating a handle H to apply pressure to a liquid column extending from the transmitter to the receiver so as to actuate receiver member M in unison with the transmitter handle H.

For applying forces to the liquid column for the purpose of transmitting these forces from the transmitter to the receiver, there may be provided in the transmitter T a cylinder 10 within which operates a trunk-type piston 11. Said cylinder is connected at one end to the duct C, which is filled with liquid, extending up to said piston. For operating the said piston in a direction to transmit force to the liquid column, there may be provided a transmitting element in the form of a lever 15 connected to operating handle H pivoted in the casing 16 at 17, said lever having an arm 18 pivotally connected at 19 to the upper end of a piston rod 20 pivotally connected to the piston at 21.

As the handle is moved in the direction of the arrow, the piston is lowered to cause the column of liquid to move through the duct C. The force which is normally applied to the piston is determined by a loading spring 22 seated against a bracket 23, fixed upon a sleeve 24, pivoted at 25 within the casing 16. The other end of said loading spring bears against a bracket 26 fixed to a member 27 having a rod 28 slidable within sleeve 24, so that said spring is extensible. The member 27 is pivoted at 29 to an arm 30 of lever 15. The position of the spring and its connection is such that the spring acts through a small lever arm to apply a slight loading force to arm 18 and the piston 11 when the piston is in uppermost position, but as the handle H is actuated in the direction of the arrow it will be seen that the spring acts through an increasing lever arm. At the same time, however, the spring is extended, so that while it acts through a larger lever arm it applies a decreasing force as said arm increases. The force applied to the piston 11, which is a product of the spring force and the lever arm, may be constant in every position of handle H, or, it may continuously increase or decrease as the handle moves from one limiting position to the other, depending upon the design.

The force applied to the liquid column in duct C is applied to the receiver which is fundamentally the same as the transmitter, but connected to be operated oppositely to the transmitter. Similar parts bear the same numeral primed. When piston 11 is at the upper end of its stroke, piston 11' is at the lower end of its stroke, and downward movement of piston 11 causes upward movement of piston 11'. The force of spring 22' is the same as the force of spring 22, and lever arms 18' and 30' bear the same relation as lever arms 18 and 30. Therefore, all movements of handle H will be duplicated by member M.

A synchronizing mechanism is provided in the form of a valve 35 which normally closes connection between the fluid reservoir formed by the interior of casing 16 and the cylinder 10. At the upper end of the piston stroke a pin 31 on handle H is adapted to rock a bellcrank 32 around a pivot 34 against the action of a spring 36 to open valve 35.

From the above description, it will become apparent that should expansion or contraction of fluid take place in the connection between the transmitter and the receiver, the springs 22 and 22' will cause the pistons to follow the ends of the liquid column, and thus synchronism between the transmitter handle H and the operated member M will be lost. As stated in the introduction hereto the bulk of the transmission liquid is contained in the duct C and therefore it has been proposed normaly to disconnect the duct from the transmitter and receiver and connect the same to an expansion chamber where it is free to expand and contract without affecting the relative positions of the transmitter and receiver elements. When the transmission system is to be operated, the duct is disconnected from the expansion chamber and connected to the transmitter and receiver. For this purpose the transmitter T may be connected to the duct C through valve structure 40. The connection between the cylinder 10 and the duct C lies by way of a passage 41 in said valve structure and said passage is normally maintained closed by a valve 42. Similarly the duct C is connected to the receiver by a valve structure 40' having therein a passageway 41' which connects the receiver cylinder 10' to the duct C, and said passageway 41' is normally closed by means of a valve 42'. The duct C also is connected to an expansion chamber V by way of a valve housing 40'' having a passageway 41'' therein, which connects the expansion chamber to the duct. The said passageway 41'' is normally open by reason of valve 42'' being held normally away from valve seat 43''. Therefore, the duct C is normally disconnected from cylinders 10 and 10' and connected to expansion chamber V. Any expansion or contraction of the liquid in duct C will have no effect on the transmitter or receiver elements, the liquid in duct C is free to expand or contract, and the duct is at all times maintained filled with liquid. Each of the valves is provided with centralizing means which take the form of a porous screen or mesh 39 of metal or fibre.

For maintaining the valves normally in the position described, there may be provided solenoids 45, 45', 45'' having stationary cores 44, 44', and 44'' cooperating with valve discs 42, 42', 42'' which are made of magnetic material. The solenoids are connected as shown in Fig. 2 so that the circuits through them are normally closed so as to cause said cores to attract their valves against the action of springs 46, 46', 46'' to maintain valves 42 and 42' against their valve seats 43 and 43' and to maintain valve 42'' away from its valve seat 43''. When the operator desires to operate the transmission system, he merely opens switch S, which may be in the form of a button on the operating handle H, and thus de-energizes coils 45, 45', 45'' to permit springs 46 and 46' to open passageways 41 and 41' and connect the transmitter and receiver to the duct C, while permitting springs 46'' to seat valve 42'' against its seat 43'' to close its passageway 41'' and thus disconnect the expansion chamber V from the duct C. The liquid control gear system is thus ready to operate and such operative condition has been effected merely by operating switch S and without the expenditure of force against the transmitter handle H. Furthermore, the transmitter handle H is effective to transmit force to receiver member M as soon as that force is applied to the transmitter handle.

The switch S in the full line position, is shown as engaging both contacts 48 and 49. In its movement from the full line to the dotted line position, switch S first leaves the contact 48, thus breaking the circuit through coil 45″ and disconnecting the duct from the reservoir. Further movement of switch S causes it to leave contact 49, thus deenergizing the coils 45 and 45′ and connecting the duct to the transmitter and the receiver. The duct is thus disconnected from the reservoir before it is connected to the transmitter and the receiver. Similarly, on releasing the switch, contact is first made between S and 49 to disconnect the duct from the transmitter and the receiver, and further movement of S causes it to engage the contact 48 to connect the duct to the reservoir.

While the system described shows coils 45, 45′ and 45″ normally energized and adapted to be de-energized when switch S is operated, it is quite apparent that switch S may be normally in the open position to maintain the coils 45, 45′ and 45″ normally de-energized, but adapted to be energized when the operator closes the switch S. This requires merely the obvious rearrangement of the valves and springs in relation to the seats.

In Figs. 3 and 4 there is shown another embodiment of this invention wherein only two valve structures 50 and 50′ perform the functions which are performed in the Figs. 1 and 2 form by the three valve structures 40, 40′ and 40″. This is made possible by employing slide valves in place of the disc valves of the Fig. 1 form. Thus in Fig. 3 there is shown the duct C normally disconnected from transmitter T and receiver R by means of piston portions 55 and 55′ forming part of slide valves 51 and 51′. In this position, the duct C communicates through reduced portion 52′ of slide valve 51′ with duct C′ extending to the expansion chamber V. Thus, in the normal position of the liquid control gear system, the duct C is disconnected from the transmitter T and the receiver R, but is connected to the expansion chamber B. When the switch S is depressed to de-energize coils 53 and 53′, the sliding valves 51 and 51′ which form the cores of the solenoids are moved by springs 54 and 54′ to the positions shown in Fig. 4, wherein transmitter T connects with duct C through the reduced portion 58 of valve 51, and the receiver R communicates with duct C through the reduced portion 59 of valve 51′, but communication between duct C and duct C′ and hence communication between duct C and expansion chamber V is interrupted by piston portion 55′ of valve 51′ assuming a position between duct C and C′ to cut off communication.

As shown in Figs. 3 and 4, the electro-magnets 53 and 53′ are adapted to be normally energized when the transmission system is not being operated, and, thus, they will attract their cores or valves 51 and 51′ against the action of springs 56 and 56′, but as soon as switch S is operated the coils 53 and 53′ are de-energized to permit the springs 54 and 54′ to move the valves to the Fig. 4 positions. However, as in the Figs. 1 and 2 form, the reverse winding may be employed and coils 53 and 53′ may be normally de-energized to permit springs to hold the valves in the Fig. 3 position, but when switch S is closed the coils may be energized to pull the valves into the Fig. 4 position against the action of the springs.

In the Figs. 3 and 4 form, coils 53 and 53′ are energized and de-energized simultaneously by actuation of switch S. In this form also, the duct C is disconnected from chamber V before being connected to T and R, but here it is accomplished mechanically by the movement of piston portions 55 and 55′. Piston portion 55′ first disconnects duct C from communication with duct C′, and further movement of piston portion 55′ then connects duct C to R. Piston portion 55 is made long enough so that duct C is not in communication with T until the other end of the duct is in communication with R.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a fluid transmission system comprising a transmitter, a reciever, and a duct adapted to connect the transmitter and the receiver, an expansion chamber, means for normally connecting the duct to the chamber and disconnecting the duct from the transmitter and the receiver, means including an electric circuit for actuating said first means to disconnect the duct from the chamber and connect the duct to the transmitter and the receiver, and means for controlling the circuit.

2. In a fluid transmission system comprising a transmitter, a receiver, and a duct adapted to connect the transmitter and the receiver, an expansion chamber, means for normally connecting the duct to the chamber and disconnecting the duct from the transmitter and receiver, means including an electric circuit for actuating said first means to disconnect the duct from the chamber and connect the duct to the transmitter and the receiver, and means adapted to be actuated by an operator for controlling the circuit.

3. In a fluid transmission system comprising a transmitter, a transmitter operating handle adapted to be grasped by an operator, a receiver and a duct adapted to connect the transmitter and the receiver, an expansion chamber, means for normally connecting the duct to the chamber and disconnecting the duct from the transmitter and the receiver, means including an electric circuit for actuating said first means to connect the duct from the chamber and connect the duct to the transmitter and the receiver, and a switch adapted to be actuated by an operator when grasping the transmitter handle for controlling the circuit.

4. In a fluid transmission system comprising a transmitter, a receiver, a duct adapted to connect the transmitter and the receiver, an expansion chamber, means including a valve between the duct and the chamber for normally connecting the duct to the chamber, means including a valve between the duct and the transmitter and a valve between the duct and the receiver for normally disconnecting the duct from the transmitter and the receiver, and means including an electric circuit for actuating said valves to connect the transmitter and the receiver to the duct, and to disconnect the chamber from the duct.

5. In a fluid transmission system comprising a transmitter, a receiver, a duct adapted to connect the transmitter and the receiver, an expansion chamber, means including a valve between the duct and the chamber for normally connecting the duct to the chamber, means including a valve between the duct and the transmitter and a valve between the duct and the receiver for normally disconnecting the duct from the transmitter and the receiver, means including an electric circuit for actuating said valves to connect the transmitter and the receiver to the duct and to disconnect the chamber from the duct, and means actuated by an operator for controlling the electric circuit.

6. In a fluid transmission system comprising a transmitter, a receiver, a duct adapted to connect the transmitter and the receiver, an expansion chamber, means including a disc valve between the duct and the chamber for normally connecting the duct to the chamber, means including a diaphragm valve between the duct and the transmitter and a disc valve between the duct and the receiver for normally disconnecting the duct from the transmitter and the receiver, and means including an electric circuit for actuating said valves to connect the transmitter and the receiver to the duct and to disconnect the chamber from the duct.

7. In a fluid transmission system comprising a transmitter, a receiver, a duct adapted to connect the transmitter and the receiver, an expansion chamber, means including a slide valve between the duct and the transmitter and a slide valve between the duct and the receiver for normally disconnecting the duct from the transmitter and the receiver and for connecting the duct to the chamber, and means including an electric circuit for actuating said valves to connect the transmitter and the receiver to the duct and to disconnect the chamber from the duct.

8. In a fluid transmission system comprising a transmitter, a receiver, a duct adapted to connect the transmitter and the receiver, an expansion chamber, means including a slide valve adjacent the transmitter between the duct and the transmitter and a slide valve between the duct and the receiver for normally disconnecting the duct from the transmitter and the receiver and connecting the duct to the chamber, and means including an electric circuit for actuating said valves to connect the transmitter and the receiver to the duct and to disconnect the chamber from the duct.

9. In a fluid transmission system comprising a transmitter, a receiver, a duct adapted to connect the transmitter and the receiver, an expansion chamber, means including a slide valve between the duct and the transmitter and a slide valve between the duct and the receiver for normally disconnecting the duct from the transmitter and the receiver and for connecting the duct to the chamber, means including an electric circuit for actuating said valves to connect the transmitter and the receiver to the duct and to disconnect the chamber from the duct, and means actuated by an operator for controlling the electric circuit.

10. In a fluid transmission system comprising a transmitter, a receiver, and a duct adapted to connect the transmitter and the receiver, an expansion chamber, means for normally connecting the duct to the chamber, means for normally disconnecting the duct from the transmitter and the receiver, means for actuating said first means to disconnect the duct from the chamber, means for actuating said second means to connect the duct to the transmitter and the receiver, and means for rendering effective said third means before rendering effective said fourth means.

11. In a fluid transmission system comprising a transmitter, a receiver, and a duct adapted to connect the transmitter and the receiver, an expansion chamber, means for normally connecting the duct to the chamber, means for normally disconnecting the duct from the transmitter and the receiver, means for actuating said first means to disconnect the duct from the chamber, means for actuating said second means to connect the duct to the transmitter and the receiver, and means for rendering effective said third means before rendering effective said fourth means and for rendering ineffective said fourth means before rendering ineffective said third means.

12. In a fluid transmission system comprising a transmitter, a receiver, and a duct adapted to connect the transmitter and the receiver, an expansion chamber, means for normally connecting the duct to the chamber, means for normally disconnecting the duct from the transmitter and the receiver, means including an electric circuit for actuating said first means to disconnect the duct from the chamber, means including a second electric circuit for actuating said second means to connect the duct to the transmitter and the receiver, and means for rendering said first circuit effective before said second circuit is rendered effective.

13. In a fluid transmission system comprising a transmitter, a receiver, and a duct adapted to connect the transmitter and the receiver, an expansion chamber, means for normally connecting the duct to the chamber, means for normally disconnecting the duct from the transmitter and the receiver, means including an electric circuit for actuating said first means to disconnect the duct from the chamber, means including a second electric circuit for actuating said second means to connect the duct to the transmitter and the receiver, and means for rendering said first circuit effective before said second circuit is rendered effective and for rendering said second circuit ineffective before said first circuit is rendered ineffective.

C. G. HEBEL.

REFERENCES CITED

The following references are of record in the file of this patent:

UNITED STATES PATENTS

| Number | Name | Date |
|---|---|---|
| 616,756 | Williamson | Dec. 27, 1898 |
| 1,890,041 | McLeod | Dec. 6, 1932 |
| 2,289,563 | Wood | July 14, 1942 |
| 2,380,575 | Brown | July 31, 1945 |
| 2,383,180 | Ellinwood | Aug. 21, 1945 |